United States Patent
Baumann et al.

(10) Patent No.: US 8,807,074 B2
(45) Date of Patent: Aug. 19, 2014

(54) SUPPLY TUBE FOR A PAINTING SYSTEM

(75) Inventors: Michael Baumann, Flein (DE);
Bernhard Seiz, Lauffen (DE); Georg M. Sommer, Ludwigsburg (DE); Timo Beyl, Besigheim (DE)

(73) Assignee: Durr Systems GmbH, Bietigheim-Bissingen (DE)

( * ) Notice: Subject to any disclaimer, the term of this patent is extended or adjusted under 35 U.S.C. 154(b) by 155 days.

(21) Appl. No.: 13/510,306

(22) PCT Filed: Nov. 8, 2010

(86) PCT No.: PCT/EP2010/006791
§ 371 (c)(1),
(2), (4) Date: May 17, 2012

(87) PCT Pub. No.: WO2011/060889
PCT Pub. Date: May 26, 2011

(65) Prior Publication Data
US 2012/0234233 A1    Sep. 20, 2012

(30) Foreign Application Priority Data
Nov. 17, 2009    (DE) .................. 10 2009 053 601

(51) Int. Cl.
*B05B 3/00* (2006.01)
*B05C 5/00* (2006.01)
*B05B 13/04* (2006.01)
*B05B 9/03* (2006.01)
*F16L 11/12* (2006.01)
*B05B 7/24* (2006.01)
*B05B 5/04* (2006.01)

(52) U.S. Cl.
CPC ............... *B05B 13/0431* (2013.01); *B05B 9/03* (2013.01); *F16L 11/121* (2013.01); *B05B 7/2491* (2013.01); *B05B 5/0415* (2013.01); *Y10S 901/43* (2013.01)
USPC .............. 118/323; 118/321; 901/43; 239/601

(58) Field of Classification Search
CPC .............................. B05B 5/04; B05B 13/0431
USPC .......... 118/300, 321, 323, 313–315; 239/601, 239/589, 592, 223, 224, 290–291, 294–297
See application file for complete search history.

(56) References Cited

U.S. PATENT DOCUMENTS 4,844,947 A * 7/1989 Kasner et al. ................. 427/510
5,937,912 A    8/1999 Ally
(Continued)

FOREIGN PATENT DOCUMENTS

| EP | 0373749 | A1 |   | 6/1990 |
| EP | 1389492 | A2 |   | 2/2004 |
| EP | 2110180 | A1 | * | 10/2009 |

(Continued)

OTHER PUBLICATIONS

International Search Report, PCT/EP2010/006791, dated Jan. 21, 2011.

*Primary Examiner* — Yewebdar Tadesse
(74) *Attorney, Agent, or Firm* — Bejin, VanOphem & Bieneman PLC

(57) ABSTRACT

Exemplary illustrations of a supply tube, e.g., for a painting system, such as for supplying compressed air to a turbine in a rotary atomizer or for supplying an atomizer with a fluid medium, such as paint or a rinsing agent, are disclosed. An exemplary supply tube may include an upstream tube section and a downstream tube section. The upstream tube section may have a larger inner cross-section than the downstream tube section. A painting robot is also disclosed, which includes an exemplary supply tube.

21 Claims, 1 Drawing Sheet

(56) References Cited

U.S. PATENT DOCUMENTS

| | | |
|---|---|---|
| 6,284,047 B1* | 9/2001 | Yoshida et al. ............... 118/629 |
| 6,422,431 B2* | 7/2002 | Pelc et al. .................... 222/422 |
| 2006/0175431 A1* | 8/2006 | Renn et al. ................... 239/296 |
| 2010/0230511 A1* | 9/2010 | Umezawa et al. ............ 239/104 |

FOREIGN PATENT DOCUMENTS

WO  WO-03086642 A1  10/2003

* cited by examiner

SUPPLY TUBE FOR A PAINTING SYSTEM

CROSS-REFERENCES TO RELATED APPLICATIONS

This application is a National Stage application which claims the benefit of International Application No. PCT/EP2010/006791 filed Nov. 8, 2010, which claims priority based on German Application No. DE 10 2009 053 601.9, filed Nov. 17, 2009, both of which are hereby incorporated by reference in their entireties.

BACKGROUND

The present disclosure relates to a supply tube for a painting installation, e.g., for the compressed air supply of a turbine in a rotary atomizer or for the supply of an atomizer with a liquid medium such as paint or rinsing agent or for the supply with guide air.

The present disclosure is further directed to a painting robot with a supply tube of this type for the supply of an atomizer guided by the painting robot.

FIG. 1 shows in a simplified form a conventional painting robot 1, which can be used for example in a painting installation for painting motor vehicle body parts. The painting robot 1 has a proximal robot arm 2 and a distal robot arm 3, wherein the proximal robot arm 2 is also designated "Arm 1" according to the pertinent specialist terminology, whereas the distal robot arm 3 is usually designated "Arm 2". The proximal robot arm 2 is mounted pivotably on a robot base, wherein the robot base can be optionally stationary or moveable and is not shown for the sake of simplicity. The distal robot arm 3, however, is pivotably attached with a swivelling joint 4 to the distal end of the proximal robot arm 2. A multi-element robot wrist 5, which guides a rotary atomizer 6 in a mobile manner is mounted on the end of the distal robot arm 3, wherein the rotary atomizer 6 has as an application element a bell cup 7, which is driven by a turbine 8. The compressed air for driving the turbine 8 is fed through a regulator 9 which is securely installed in the proximal robot arm 2, wherein the regulator 9 regulates the rotary speed of the turbine 8 and thereby also the rotary speed of the bell cup 7 via a corresponding throttling of the introduced air flow. The connection between the regulator 9 and the turbine 8 is guided through the proximal robot arm 2, the swivelling joint 4, the distal robot arm 3 and the robot wrist 5. After a short tube section of a few centimeters with dimensions 9×12 mm the connection downstream from the regulator 9 is divided via a Y-tube 10 into two 9×12 mm-tubes 11, 12, which are then connected by a tube guide element 13 to two reducers 14, 15 in or on the swivelling joint 4. On the downstream side, each of the two reducers 14, 15 is connected to a 6×8 mm tube 16, 17, wherein both 6×8 mm tubes 16, 17 are guided to the turbine 8 through a tube guide element 18, the distal robot arm 3 and the robot wrist 5 and thus drive said turbine 8.

The compressed air supply of the turbine 8 is, therefore, divided into the two 9×12 mm tubes 11, 12 in the proximal robot arm 2 and the two 6×8 mm-tubes 16, 17 in the distal robot arm 3. The large 9×12 mm tubes 11, 12 offer in this case, due to their relatively large internal cross section, the advantage of a correspondingly small flow resistance. However, the large 9×12 mm-tubes 11, 12 are not suitable for installation in the robot wrist 5 as the large 9×12 mm-tubes 11, 12 would not withstand the torsional loads in the robot wrist 5. Therefore, the smaller 6×8 mm-tubes 16, 17 which, due to their smaller cross section, can permanently withstand the torsional loads in the robot wrist 5 during operation, are installed in the robot wrist 5.

In this known painting robot, however, the fact that the flow resistance of the compressed air supply of the turbine 8 is increased between the regulator 9 and the turbine 8 by the relatively small internal cross section of the 6×8 mm tubes 16, 17 is a disadvantage.

For solving this problem, it has been already been envisioned to move the reducer 14, 15 out of the swivelling joint 4 in the direction of flow, i.e. into the distal robot arm 3. This is not achievable, however, due to the torsional loads in the robot wrist 5 and the resulting abrasion of further tubes on the reducers 14, 15. Furthermore, the reducers 14, 15 would not withstand the mechanical loads in the region of the robot wrist 5 if the reducers 14, 15 were moved too close to the robot wrist 5 in the distal robot arm 3. It would not be possible, therefore, to ensure a secure connection between the reducers 14, 15 and the 6×8 mm-tubes 16, 17 in such a solution. In addition, further tubes would also be affected.

Nor can the aforementioned problem be solved by guiding the large 9×12 mm tubes 11, 12 through the robot wrist 5, because such large tubes will not withstand the torsional loads in the robot wrist 5.

Furthermore, in one known approach, e.g., FIG. 4 from DE 603 04 386 T2, a line system with a first supply line and a second supply line is provided, wherein both supply lines obviously have a different internal cross section. This is not, however, a one-piece line but two separate lines with different internal cross sections.

Finally, with regard to the general state of the art, reference is made to the document published by the applicant, "Technical handbook: Introduction to the technique of passenger car painting". This document, however, discloses only conventional supply tubes and their application in the area of painting technology.

Accordingly, there is a need to reduce the flow resistance in a compressed air supply of a turbine or a guide air supply of a rotary atomizer.

BRIEF DESCRIPTION OF THE FIGURES

While the claims are not limited to the specific illustrations described herein, an appreciation of various aspects is best gained through a discussion of various examples thereof. Referring now to the drawings, illustrative examples are shown in detail. Although the drawings represent the exemplary illustrations, the drawings are not necessarily to scale and certain features may be exaggerated to better illustrate and explain an innovative aspect of an illustration. Further, the exemplary illustrations described herein are not intended to be exhaustive or otherwise limiting or restricting to the precise form and configuration shown in the drawings and disclosed in the following detailed description. Exemplary illustrations are described in detail by referring to the drawings as follows:

FIG. 4 is a detailed representation of a distal robot arm with a wrist and a rotary atomizer along with a supply tube, which is guided through the distal robot arm and the wrist.

DETAILED DESCRIPTION

Figure 1:
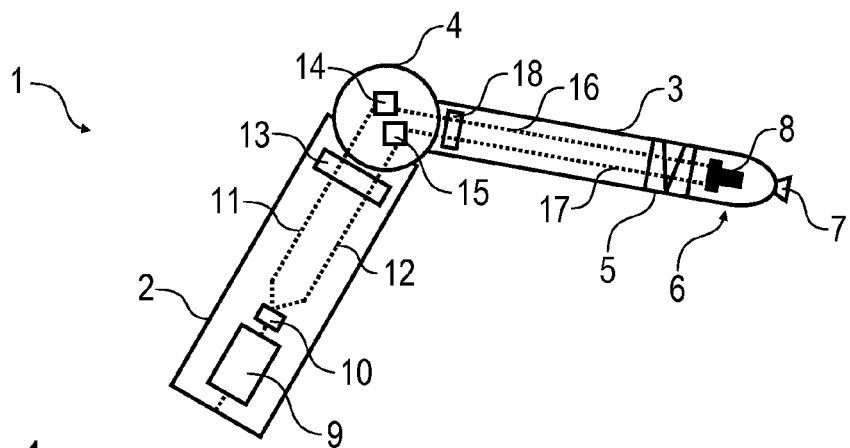
FIG. 1 is a schematic representation of a conventional painting robot with a conventional supply tube.

The exemplary illustrations comprise the general technical teaching of creating a supply tube, wherein an upstream tube section has a larger internal cross section than a downstream tube section.

Due to its smaller internal cross section, the downstream tube section may have in this case a sufficient torsion capability to permanently withstand the multiple rotary movements of a multi-element robot wrist during the operation, which is obtained with the disadvantage of a correspondingly larger flow resistance. In contrast, due to a larger internal cross section, the upstream tube section may generally be too rigid to cooperate in the rotary movements of the multi-element robot wrist but it has the advantage of a correspondingly lower flow resistance. The exemplary illustrations, therefore, resolve the conflict of aims in the prior art between a minimum flow resistance on the one hand and a maximum torsion capability on the other hand in that the supply tube is divided into two tube sections, wherein the proximal tube section is optimized to a flow resistance, which is as low as possible, whereas the distal tube section is optimized to a torsion capability, which is as high as possible.

In one exemplary illustration, the length of the upstream tube section with the greater internal cross section is more than 30 cm, 40 cm or 45 cm, wherein a typical value for the length of the upstream tube section is a length of 1 m or 50 cm. The length of the upstream tube section, therefore, may correspond essentially to the length of a distal robot arm ("Arm 2") of a painting robot or at least to a major portion thereof. For example, the upstream tube section with the larger internal cross section may extend over a length of at least 50%, 60%, 70%, 80% or even at least 90% of the length of the distal robot arm in order to keep the flow resistance as small as possible.

The length of the downstream tube section with the smaller internal cross section and the correspondingly greater flow resistance, however, may be less than 35 cm, 30 cm, 25 cm or 20 cm such that the whole flow resistance is not increased unnecessarily. The length of the downstream tube section with the smaller internal cross section, therefore, may correspond, in one exemplary illustration, essentially to the length of a robot wrist such that the supply tube within the robot wrist has the smaller internal cross section and, therefore, a sufficient torsion capability.

In one example, the upstream tube section with the larger internal cross section is, therefore, significantly longer than the downstream tube section with the smaller internal cross section. This makes sense in order to keep the flow resistance as small as possible. The downstream tube section with the smaller internal cross section may, therefore, have only a length sufficient to bridge the robot wrist.

It should be further mentioned that between the two tube sections with the different internal cross sections there may be a transitional section in which the internal cross section of the supply tube tapers in the direction of flow. This transitional section between the two outer tube sections may be significantly shorter than the upstream tube section and/or the downstream tube section.

From the preceding description it is already clear that, due to its larger internal cross section in relation to the supply tube, the upstream tube section may have a lower specific flow resistance than the downstream tube section.

It is further to be mentioned that the transition from the upstream tube section to the downstream tube section may be continuous and/or step-free.

It should be furthermore noted that an exemplary supply tube may be formed as one piece. This means that the two tube sections with the different internal cross sections are component parts of the same supply tube. This is to be differentiated from, for example multi-element tubes, wherein the individual elements have different internal cross sections and are connected with one another via tube connections.

Consequently, the two tube sections with the different internal cross sections may be formed of the same material.

For example, an exemplary supply tube may consist of polyamide (PA), polyethylene (PE), perfluoroalkoxy polyer resin (PFA), polytetrafluoroethylene (PTFE), polyurethane (PU) or polyvinyl chloride (PVC). However, with respect to the material of the supply tube, the exemplary illustrations are not limited to the aforementioned material examples. Furthermore, an exemplary supply tube can also consist of a combination of said materials.

In an exemplary illustration, the internal cross section of the supply tube is constant in the upstream tube section as well as in the downstream tube section. However, within the context of the exemplary illustrations, there is also the option of the internal cross section of the supply tube continuously narrowing from the proximal end to the distal end.

It is further to be mentioned that an exemplary supply tube may be solvent-resistant and/or paint-resistant in order to permit its use in a painting installation.

For use in an electrostatic coating installation, it is also possible that the supply tube is of an electric insulating material, which can be furthermore piggable. Within the context of the exemplary illustrations, it is therefore possible that an exemplary supply tube is piggable at least in sections.

With respect to the dimensions of an exemplary supply tube, there are various options within the context of the exemplary illustrations. The internal diameter of the downstream tube section may be, merely as examples, less than 12 mm, 11 mm, 10 mm, 9 mm or even less than 8 mm. The internal diameter of the upstream tube section, however, may be, merely as examples, more than 5 mm, 6 mm, 7 mm, 8 mm, 9 mm, 10 mm, 11 mm or 12 mm.

The outer diameter of the downstream tube section conversely may be less than 13 mm, 12 mm, 11 mm, 10 mm, 9 mm, 8 mm or 7 mm, whereas the outer diameter of the upstream tube section in may be greater than 6 mm, 7 mm, 8 mm, 9 mm, 10 mm or even 11 mm.

There are also various options with respect to the wall thickness of the supply tube. The downstream tube section may have a wall thickness of less than 2 mm, 1.5 mm or 1.1 mm and/or a wall thickness of more than 0.5 mm, 0.7 mm, 0.8 mm or 0.9 mm. In contrast, the wall thickness of the upstream tube section may be less than 2 mm, 1.8 mm, 1.7 mm or 1.6 mm and/or greater than 1 mm, 1.1 mm, 1.2 mm, 1.3 mm or 1.4 mm.

It is also to be mentioned that an exemplary supply tube may have a pressure resistance of more than 3 bar, 4 bar or 5 bar. Sufficient pressure resistance to operate a conventional 6 bar network is desirable.

With respect to the wall thickness of the supply tube according to the exemplary illustrations, it is also to be mentioned that the wall thickness in the downstream tube section is generally smaller than the wall thickness in the upstream tube section.

For example, an exemplary supply tube can have a 11×14 mm tube section upstream and a 9×12 mm tube section downstream. However, it is also possible for the upstream tube section to have the dimensions 9×12 mm, while the downstream tube section has the dimensions 6×8 mm. A further exemplary illustration provides for dimensions of 6×8 mm upstream and dimensions of 2.7×4 mm downstream.

Furthermore, it is to be mentioned that the exemplary illustrations do not only include the aforementioned novel supply tube as a single component. Rather, the exemplary illustrations are further directed to a painting robot with a supply tube of this type for the supply of an application device guided by the painting robot, for instance a rotary atomizer.

In this case, the supply tube can supply, for example, a turbine in the rotary atomizer with drive air or can supply the application device with a liquid medium such as paint or rinsing agent. An exemplary supply tube can furthermore be used to conduct guide air, tip air or atomizer air. An exemplary supply tube may, therefore, be basically suitable for conducting all fluids required during the operation of an atomizer.

An exemplary painting robot may have a proximal robot arm and a distal robot arm, wherein the distal robot arm is pivotably attached by means of a joint to the proximal robot arm. The exemplary painting robots may further have a robot wrist for guiding an application device, wherein the robot wrist is mounted at the end of the distal robot arm. Any kinematic assembly of a plurality of pivotable robot arms with a robot wrist may be employed that is convenient.

In the case of the exemplary painting robots, the novel supply tube as described above and formed according to the exemplary illustrations may run through the distal robot arm and through the robot wrist to the application device in order to supply said application device. In this case, the downstream tube section with the smaller internal cross section may be limited to the robot wrist, whereas the upstream tube section with the larger internal cross section may extend essentially or substantially over the entire distal robot arm, or at least a major portion thereof. This limitation of the downstream tube section with the smaller internal cross section to the robot wrist is advantageous because the overall flow resistance is minimized by this means.

It should also be mentioned that, in one exemplary illustration, a supply tube connector may be arranged in the joint between the proximal robot arm and the distal robot arm, wherein the supply tube connector is connected downstream to an exemplary supply tube, which runs through the distal robot arm, whereas the supply tube connector is connected upstream to a further supply tube, which can be formed in a conventional manner and which runs through the proximal robot arm.

A speed regulator, which may feed the further conventional supply tube with compressed air can be furthermore arranged in the proximal robot arm.

Figure 2:
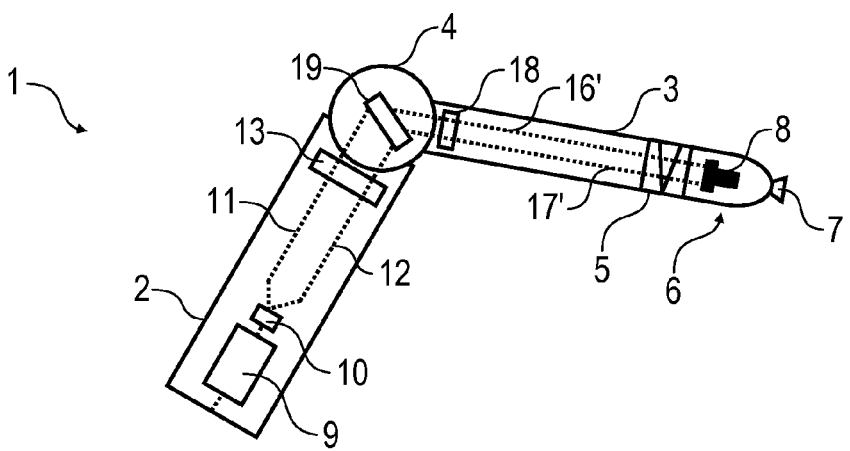
FIG. 2 is a schematic representation of an exemplary painting robot having a supply tube, according to an exemplary illustration.

The exemplary illustration shown in FIG. 2 of a painting robot 1 corresponds in some respects to the above discussion referencing FIG. 1 of a conventional painting robot 1 such that, to avoid repetition, we refer to the preceding description, wherein the same reference numerals are used for corresponding details in the description below.

One particularity of this exemplary illustration is that, instead of the reducer 14, 15, a double plug connector 19 with the same diameter is arranged in the swivelling joint 4. The double plug connector 19, therefore, may provide connecting pieces for 9×12 mm tubes on the input side and on the output side.

Figure 3:
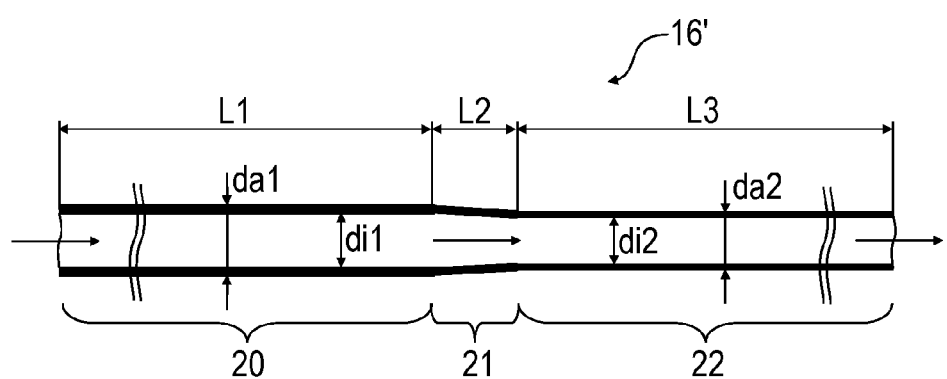
FIG. 3 is a longitudinal section through an exemplary supply tube.

A further particularity of this exemplary illustration consists in the design of the supply tubes 16', 17', which may be formed as shown in FIG. 3.

Thus, for example, the supply tube 16' has a proximal tube section 20, a transitional section 21 and a distal tube section 22.

In this exemplary illustration, the dimensions of the proximal tube section 20 are 9×12 mm. This means that the internal diameter of the proximal tube section 20 is $di1=9$ mm and the outer diameter is $da1=12$ mm, which is linked with a wall thickness of 1.5 mm.

The dimensions of the distal tube section 22, however, are 6×8 mm. This means that the internal diameter of the distal tube section 22 is $di2=6$ mm and the outer diameter is $da2=8$ mm, which is linked with a wall thickness of 1 mm.

In the transitional section 21, the outer diameter transitions step-free from the outer diameter $da1$ of the proximal tube section to the outer diameter $da2$ of the distal tube section 22. In the same way the internal diameter in the transitional section 21 changes from the internal diameter $di1$ of the proximal tube section to the internal diameter $di2$ of the distal tube section.

In this case, the length L3 of the distal tube section 22 is only insignificantly greater than the length of the robot wrist 5. In this way, the distal tube section 22 permits largely unhindered movement of the robot wrist 5 without, however, increasing the flow resistance unnecessarily.

In contrast, the length of the proximal tube section 20 is $L1=1$ m such that the proximal tube section 20 essentially extends from the double plug connector 19 over the entire length of the distal robot arm 3, such that the flow resistance is barely decreased unnecessarily.

The length L2 of the transitional section 21, however, is a few centimeters in order to achieve a turbulence-free transition from the proximal tube section 20 to the distal tube section 22.

FIG. 4 finally shows a schematic representation of the distal robot arm 3 with the robot wrist 5 and the atomizer 6 and the supply tube 16', according to an exemplary illustration. From this, it is clear that the distal tube section 22 with the smaller internal cross section is essentially limited to the range of the robot wrist 5, whereas the proximal tube section 21 with the larger internal cross section extends over almost the entire length of the distal robot arm 3.

The exemplary illustrations are not limited to the previously described examples. Rather, a plurality of variants and modifications are possible, which also make use of the ideas of the exemplary illustrations and therefore fall within the protective scope. Furthermore the exemplary illustrations also include other useful features, e.g., as described in the subject-matter of the dependent claims independently of the features of the other claims.

Reference in the specification to "one example," "an example," "one embodiment," or "an embodiment" means that a particular feature, structure, or characteristic described in connection with the example is included in at least one example. The phrase "in one example" in various places in the specification does not necessarily refer to the same example each time it appears.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain examples, and should in no way be construed so as to limit the claimed invention.

Accordingly, it is to be understood that the above description is intended to be illustrative and not restrictive. Many examples and applications other than those specifically provided would be evident upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future examples. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary is made herein. In particular, use of the singular articles such as "a," "the," "the," etc. should be read to recite one or more of the indicated elements unless a claim recites an explicit limitation to the contrary.

LIST OF REFERENCE NUMERALS

1 Painting robot
2 Proximal robot arm
3 Distal robot arm
4 Swiveling joint
5 Robot wrist
6 Rotary atomizer
7 Bell cup
8 Turbine
9 Controller
10 Y-tube
11 9×12 mm tube
12 9×12 mm tube
13 Tube guide element
14 Reducer
15 Reducer
16 6×8 mm tube
16' Supply tube
17 6×8 mm tube
17' Supply tube
18 Tube guide element
19 Double plug connector
20 Proximal tube section
21 Transitional section
22 Distal tube section

The invention claimed is:

1. A painting robot, comprising:
a supply tube including an upstream tube section and a downstream tube section, wherein the upstream tube section has a larger internal cross section than the downstream tube section;
a proximal robot arm;
a distal robot arm mounted on the end of the proximal robot arm;
a joint pivotably connecting the distal robot arm to the proximal robot arm; and
a robot wrist for guiding an application device, wherein the robot wrist is mounted on the end of the distal robot arm, wherein the supply tube runs through the distal robot arm and through the robot wrist to the application device, the downstream tube section with the smaller internal cross section is contained within the robot wrist, and the upstream tube section with the larger internal cross section extends over at least a portion of the distal robot arm.

2. The painting robot according to claim 1, wherein the length of the upstream tube section with the larger internal cross section is more than 30 cm.

3. The painting robot according to claim 1, wherein the length of the upstream tube section with the larger internal cross section essentially corresponds to a distal robot arm length of a painting robot.

4. The painting robot according to claim 1, wherein the length of the downstream tube section with the smaller internal cross section is less than 50 cm.

5. The painting robot according to claim 1, wherein the length of the downstream tube section with the smaller internal cross section essentially corresponds to a robot wrist length.

6. The painting robot according to claim 1, wherein the upstream tube section with the larger internal cross section is longer than the downstream tube section with the smaller cross section.

7. The painting robot according to claim 1, wherein:
the downstream tube section has a sufficient torsion capability to permanently withstand the multiple rotary movements of a multi-element robot wrist, and
due to its larger internal cross section, the upstream tube section is too rigid to cooperate with the rotary movements of the multi-element robot wrist.

8. The painting robot according to claim 1, wherein between the upstream tube section with the larger internal cross section and the downstream tube section with the smaller internal cross section there is a transitional section in which the internal cross section of the supply tube tapers in the direction of flow.

9. The painting robot according to claim 8, wherein the transitional section is shorter than the upstream tube section.

10. The painting robot according to claim 1, wherein the upstream tube section merges into the downstream tube section in a continuous transition.

11. The painting robot according to claim 1, wherein the upstream tube section and the downstream tube section are made of the same material.

12. The painting robot according to claim 1, wherein the upstream tube section and the downstream tube section are formed as one piece.

13. The painting robot according to claim 1, wherein the whole supply tube is formed as one piece.

14. The painting robot according to claim 1, wherein:
the internal cross section within the upstream tube section is essentially constant, and
the internal cross section within the downstream tube section is essentially constant.

15. The painting robot according to claim 1, wherein the supply tube is solvent-resistant and paint-resistant.

16. The painting robot according to claim 1, wherein the supply tube consists of an electrically insulating material.

17. The painting robot according to claim 1, wherein the supply tube in the upstream tube section is piggable.

18. A painting robot, comprising:
a supply tube including an upstream tube section and a downstream tube section, wherein the upstream tube section has a larger internal cross section than the downstream tube section;
a proximal robot arm;
a distal robot arm mounted on the end of the proximal robot arm;
a joint pivotably connecting the distal robot arm to the proximal robot arm; and a robot wrist for guiding an application device, wherein the robot wrist is mounted on the end of the distal robot arm, wherein:

a supply tube connector is arranged in the joint between the proximal robot arm and the distal robot arm, the supply tube connector is connected downstream to the supply tube which runs through the distal robot arm, the supply tube connector is connected upstream to a further supply tube, which runs through the proximal robot arm, and a speed regulator, which supplies said further supply tube with compressed air, is arranged in the proximal robot arm.

19. The painting robot according to claim 1, wherein the supply tube supplies a turbine in a rotary atomizer with drive air.

20. The painting robot according to claim 1, wherein the supply tube supplies the application device with a liquid medium.

21. The painting robot according to claim 1, wherein the supply tube supplies the application device with guide air, wherein the guide air serves to shape the spray jet discharged by the application device.

\* \* \* \* \*